United States Patent [19]

Kestner et al.

[11] 4,207,300

[45] Jun. 10, 1980

[54] PROCESS FOR THE PREPARATION OF ORTHOPHOSPHOROUS ACID AND PHOSPHINE

[75] Inventors: Mark O. Kestner, Mendham, N.J.; Pamela J. Teliszczak, Carpentersville, Ill.

[73] Assignee: Borg-Warner Corp., Chicago, Ill.

[21] Appl. No.: 970,846

[22] Filed: Dec. 18, 1978

[51] Int. Cl.$^2$ ............... C01B 25/06; C01B 25/163
[52] U.S. Cl. ................................ 423/299; 423/316
[58] Field of Search ..................... 423/316, 299, 304

[56] References Cited

U.S. PATENT DOCUMENTS

| | | | |
|---|---|---|---|
| 3,437,438 | 4/1969 | Carroll et al. | 423/316 |
| 3,437,439 | 4/1969 | Carroll | 423/316 |
| 3,437,440 | 4/1969 | Carroll | 423/316 |
| 3,528,772 | 9/1970 | Whyte et al. | 423/316 |
| 3,532,461 | 10/1970 | Whyte et al. | 423/316 |
| 3,632,311 | 1/1972 | Kovacs et al. | 423/316 |
| 3,679,374 | 7/1972 | Kovacs | 423/316 |

OTHER PUBLICATIONS

Richardson, J. Chem. Soc. (London), vol. 51 (1887), pp. 801–806.
Jacobson, Encyclopedia of Chemical Reactions, vol. 5 (1953), p. 364.
Mellor, Comprehensive Treatise on Inorganic & Theoretical Chemistry, vol. 8 (1928), pp. 901–902.

*Primary Examiner*—O. R. Vertiz
*Assistant Examiner*—Thomas W. Roy
*Attorney, Agent, or Firm*—Richard J. Schlott

[57] ABSTRACT

The direct reaction of elemental phosphorus acid catalyzed by hydroiodic acid produces orthophosphorus acid free of orthophosphoric acid and phosphine free of diphosphine.

5 Claims, No Drawings

PROCESS FOR THE PREPARATION OF ORTHOPHOSPHOROUS ACID AND PHOSPHINE

BACKGROUND OF THE INVENTION

This invention relates to a method for making orthophosphorous acid and phosphine. More particularly, this invention is a method for the preparation of orthophosphorous acid and phosphine from elemental phosphorus and water. Still more particularly, this invention is a method for the preparation of orthophosphorus acid and phosphine by way of a hydroiodic acid-catalyzed reaction of elemental phosphorus with water.

Methods for making orthophosphorus acid, $H_3PO_3$, have long been known. More recently, practical methods for preparing orthophosphorous acid have been developed, including a process whereby the trivalent oxide is formed by a controlled air oxidation of elemental phosphorous and subsequently hydrolyzed, as is disclosed in U.S. Pat. No. 3,528,772. Such processes produce a mixture of acids containing orthophosphorous acid together with as much as 25% orthophosphoric acid, $H_3PO_4$, or more. Separating the orthophosphorous acid from the mixture in a highly purified form thus requires additional process steps such as those disclosed in U.S. Pat. Nos. 3,632,311 and 3,679,374.

Alternative prior art methods for obtaining orthophosphorous acid include the hydrolysis of a phosphorous trihalide such as phosphorus triiodide ($PI_3$) with water to produce orthophosphorous acid and the corresponding hydrogen halide. An improved process employing this scheme is disclosed in U.S. Pat. No. 3,437,439, and includes the steps of in situ generation of $PI_3$ from phosphorous and iodine in the presence of an oxidizing agent and a solvent, followed by hydrolysis to form orthophosphorous acid. As with the air oxidation processes previously discussed, this process forms a mixture containing a substantial proportion of orthophosphoric acid which must then be subjected to a separation process step if pure orthophosphorous acid is desired.

SUMMARY OF THE INVENTION

In the process of this invention, orthophosphorous acid free of orthophosphoric acid is produced in high yield by the reaction of elemental phosphorus with water in the presence of hydroiodic acid. More particularly, elemental phosphorus readily reacts with water in the presence of hydroiodic acid and, optionally, an organic solvent, by a disproportionation to produce equimolar amounts of phosphine ($PH_3$) and orthophosphorous acid, apparently according to the equation:

$$2P + 3H_2O \xrightarrow{HI} PH_3 + H_3PO_3.$$

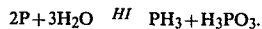

Phosphine, being a gas under the reaction conditions, evolves from the reaction mixture and may be collected for other uses. The reaction mixture, after distillation to remove hydroiodic acid, water and any solvent present, consists of a clear viscous orthophosphorous acid containing no detectable amounts of orthophosphoric acid or other acids of phosphorus.

DETAILED DESCRIPTION OF THE INVENTION

The common forms of elemental phosphorous include the clear or whitish-yellow waxy solid melting at 44° known as white phosphorus, and a red, high melting, less reactive substance known as red phosphorus. For the purposes of the process of this invention, only the white phosphorus is useful. The elemental phosphorus may be employed as a finely divided solid or as a melt, or it may be dissolved or dispersed in an inert organic solvent.

Elemental phosphorus is substantially insoluble in water and does not react with water at any appreciable rate. In the presence of an acid and in particular in the presence of aqueous hydroiodic acid, elemental phosphorus appears to undergo disproportionation to form phosphine and orthophosphorus acid. The reaction proceeds best at elevated temperatures in the range of 100° to 130° C., and appears to require that hydroiodic acid be present in a ratio greater than 6 moles of hydrogen iodide (HI) for each phosphorus molecule ($P_4$). At ratios below about 6:1, some of the white elemental phosphorus is converted to insoluble and inert red phosphorus, lowering the overall yield and contaminating the final product.

Hydroiodic acid forms a constant boiling azeotrope with water containing 57% HI which boils at 127° C. The process of this invention may thus be conveniently carried out by adding elemental phosphorus, in a continuous stream or incrementally, to a pot containing refluxing 57% aqueous hydroiodic acid and replenishing the water as it is consumed or lost through evaporation to maintain the boiling temperature at or below 127° C. The reaction may be carried out in more dilute hydroiodic acid solutions if desired, and at any convenient temperature in the range of 100° to 130° C., however, at temperatures above about 127° C., phosphonium iodide, $PH_4I$, sublimes from the reaction mixture, leading to a substantial reduction in the concentration of hydroiodic acid.

It is absolutely essential that the reaction be carried out in an inert gas atmosphere. Elemental phosphorus is spontaneously flammable in moist air, and the phosphine produced is flammable and forms potentially explosive mixtures with air or oxygen. For reasons of safety, the reaction vessel will thus be purged with an inert gas such as nitrogen or argon and a slight positive pressure of inert gas will preferably be maintained throughout the reaction period to prevent air from entering the vessel.

An inert organic solvent for the elemental phosphorus may optionally be included to aid in dispersing the phosphorus. The solvents useful for the purposes of this invention will be inert organic liquids which boil at a temperature within or slightly above the preferred temperature range and which may be readily distilled from the pot mixture at the end of the reaction period, including, for example, anhydrous, $C_1$ to $C_6$ aliphatic carboxylic acids. The solvent may be employed directly in the reaction mixture with the aqueous hydroiodic acid, or alternatively the elemental phosphorus may be dispersed in the solvent and added therewith in a steady stream. Because of its stability, convenient boiling temperature of 118° C. and ready availability, acetic acid will be preferred for these purposes. The proportion of solvent employed is not critical; when added directly to the reaction mixture, approximately equal volumes of the solvent and aqueous hydroiodic acid may be conveniently employed.

The products of the reaction are orthophosphorous acid, which remains in the reaction mass, and gaseous phosphine which is evolved and may be conducted out of the reaction vessel, optionally water-scrubbed to remove HI, then collected by any convenient method such as cold trapping and gas-liquid displacement. Phosphine is both flammable and highly-toxic, and precautions must be taken to prevent its escape into the air and to ensure that no exposure to phosphine can occur.

Phosphine is commercially useful as a synthesis intermediate. Alternatively, phosphine may be readily oxidized to form phosphoric acid. Prior art methods for the preparation of phosphine generally produce phosphine contaminated with significant amounts of diphosphine, $P_2H_4$ which is considerably more flammable and potentially more of an explosion hazard than phosphine. Surprisingly, the instant process results in very pure phosphine containing no detectable amounts of diphosphine. The process of this invention thus also provides a very practical and convenient method for the production of very pure phosphine.

The reaction vessel, after the addition of phosphorus is complete and the evolution of phosphine has ceased, contains orthophosphorous acid and aqueous hydroiodic acid, together with the solvent, if employed. The mixture is then distilled to strip off the hydroiodic acid as the azeotrope which may be re-used directly. The pot mixture after distillation contains only clear viscous orthophosphorus acid with no other acids of phosphorus such as orthophosphoric acid. The mass is readily crystallized if desired.

The process of this invention may be carried out either as a batch or continuous flow process. In a continuous process, molten phosphorous would be continuously added under an inert atmosphere to the pot mixture of 57% aqueous hydroiodic acid and solvent heated to a temperature of 127° C. Phosphine would be collected as it evolved, and pot mixture would be continuously removed to a second heated vessel and stripped of solvent and hydroiodic acid azeotrope. The azeotrope would be returned to the reaction vessel.

The process of this invention will be better understood by consideration of the following Example:

EXAMPLE

To a 0.5 l round bottom flask fitted with a stirrer, a reflux condenser and a thermometer were added 0.15 l of glacial acetic acid and 0.118 l of 57% aqueous hydroiodic acid. The mixture was slowly stirred, purged with nitrogen, and heated to 125°–129° C. Elemental phosphorus (105 g.) was added incrementally over a period of 30 days, and water was periodically added to maintain the boiling temperature of the reaction mass below 127° C.

As phosphine evolved, it was passed through a water-filled gas scrubber, then collected by trapping in a sodium hypochlorite solution. The total phosphine generated amounted to 51 g (89% yield). The gas stream was completely free of diphosphine ($P_2H_4$).

The pot mixture was fractionally distilled to remove the acetic acid and hydroiodic acid azeotrope. The pot residue, amounting to 105 g (76.6% yield) was a clear viscous liquid. Chromatographic analysis showed this product to be $H_3PO_3$, with no detectable trace of $H_3PO_4$ or other phosphorus acids.

The invention will thus be seen to be a method for the preparation of orthophophorus acid and phosphine comprising the steps of adding elemental white phosphorus to aqueous hydroiodic acid, optimally in the presence of a solvent, at a reaction temperature of about 100° to 130° C., collecting phosphine as it is evolved, stripping hydroiodic acid, water and any solvent from the reaction mixture, thereby providing orthophosphorous acid.

We claim:

1. A process for preparing orthophosphorous acid and phosphine comprising
    adding elemental phosphorus to a reaction vessel containing a mixture consisting of water, a $C_1$–$C_6$ aliphatic carboxylic acid and hydroiodic acid at a temperature between about 100° and 130° C. under an inert gas atmosphere;
    collecting phosphine from the reaction vessel; and
    distilling aqueous hydroiodic acid, said carboxylic acid and water from the reaction vessel.

2. The process of claim 1 wherein said carboxylic acid is acetic acid.

3. The process of claim 1 wherein said elemental phosphorus is charged at a rate such that the ratio of hydroiodic acid to elemental phosphorus is maintained at a value greater than 6:1.

4. A process for the preparation of orthophosphorus acid and phosphine consisting of combining acetic acid, aqueous hydroiodic acid and elemental phosphorus at a temperature between about 100° and 130° C., collecting phosphine and stripping the acetic acid, hydroiodic acid and water from the orthophosphorous acid.

5. The process of claim 4 wherein the hydroiodic acid and elemental phosphorus are in a ratio greater than about 6:1.

* * * * *